(12) United States Patent
Belmonte et al.

(10) Patent No.: US 9,664,117 B2
(45) Date of Patent: May 30, 2017

(54) GUIDANCE OF TURBINE ENGINE SHAFTS

(71) Applicant: SNECMA, Paris (FR)

(72) Inventors: Olivier Belmonte, Moissy-Cramayel (FR); Julien Austruy, Moissy-Cramayel (FR); Mathieu Perrier, Moissy-Cramayel (FR)

(73) Assignee: SNECMA, Paris (FR)

( * ) Notice: Subject to any disclaimer, the term of this patent is extended or adjusted under 35 U.S.C. 154(b) by 638 days.

(21) Appl. No.: 14/097,774

(22) Filed: Dec. 5, 2013

(65) Prior Publication Data

US 2014/0161592 A1 Jun. 12, 2014

(30) Foreign Application Priority Data

Dec. 11, 2012 (FR) ...................... 12 61859

(51) Int. Cl.
*F02C 7/36* (2006.01)
*F01D 25/16* (2006.01)
*F02C 3/067* (2006.01)

(52) U.S. Cl.
CPC ................ *F02C 7/36* (2013.01); *F01D 25/16* (2013.01); *F02C 3/067* (2013.01)

(58) Field of Classification Search
CPC ........ F01D 25/16; F01D 25/162; F01D 5/026; F02C 7/32; F02C 7/36; F02C 3/107
See application file for complete search history.

(56) References Cited

U.S. PATENT DOCUMENTS

| 8,402,741 | B1 * | 3/2013 | Merry ..................... F01D 25/16 60/226.1 |
|---|---|---|---|
| 2005/0172608 | A1 | 8/2005 | Lapergue et al. |
| 2006/0254253 | A1 | 11/2006 | Herlihy et al. |
| 2008/0022653 | A1 | 1/2008 | Schilling |
| 2012/0237334 | A1 | 9/2012 | McCune et al. |

(Continued)

FOREIGN PATENT DOCUMENTS

| EP | 1 564 352 A2 | 8/2005 |
|---|---|---|
| EP | 1 887 199 A2 | 2/2008 |

(Continued)

OTHER PUBLICATIONS

"Self-aligning bearings", NSK, published Feb. 14, 2010.*

(Continued)

*Primary Examiner* — Igor Kershteyn
*Assistant Examiner* — Justin Seabe
(74) *Attorney, Agent, or Firm* — Oblon, McClelland, Maier & Neustadt, L.L.P.

(57) ABSTRACT

A turbine engine including a power gear box shaft, a turbine shaft, a connecting part of annular shape by which one end of the power gear box shaft and one end of the turbine shaft are connected in a rotationally fixed manner, a structural housing, and a guide bearing for guiding the connecting part relative to the housing, is provided. The guide bearing is mounted between the connecting part and the housing and includes an external ring mounted on the housing, an internal ring mounted on the connecting part, and at least one rolling element configured to enable the external ring to roll around the internal ring. The guide bearing is configured to form a ball joint link enabling a relative angular displacement of its external ring with respect to its internal ring.

4 Claims, 2 Drawing Sheets

(56) References Cited

U.S. PATENT DOCUMENTS

Figure 1:
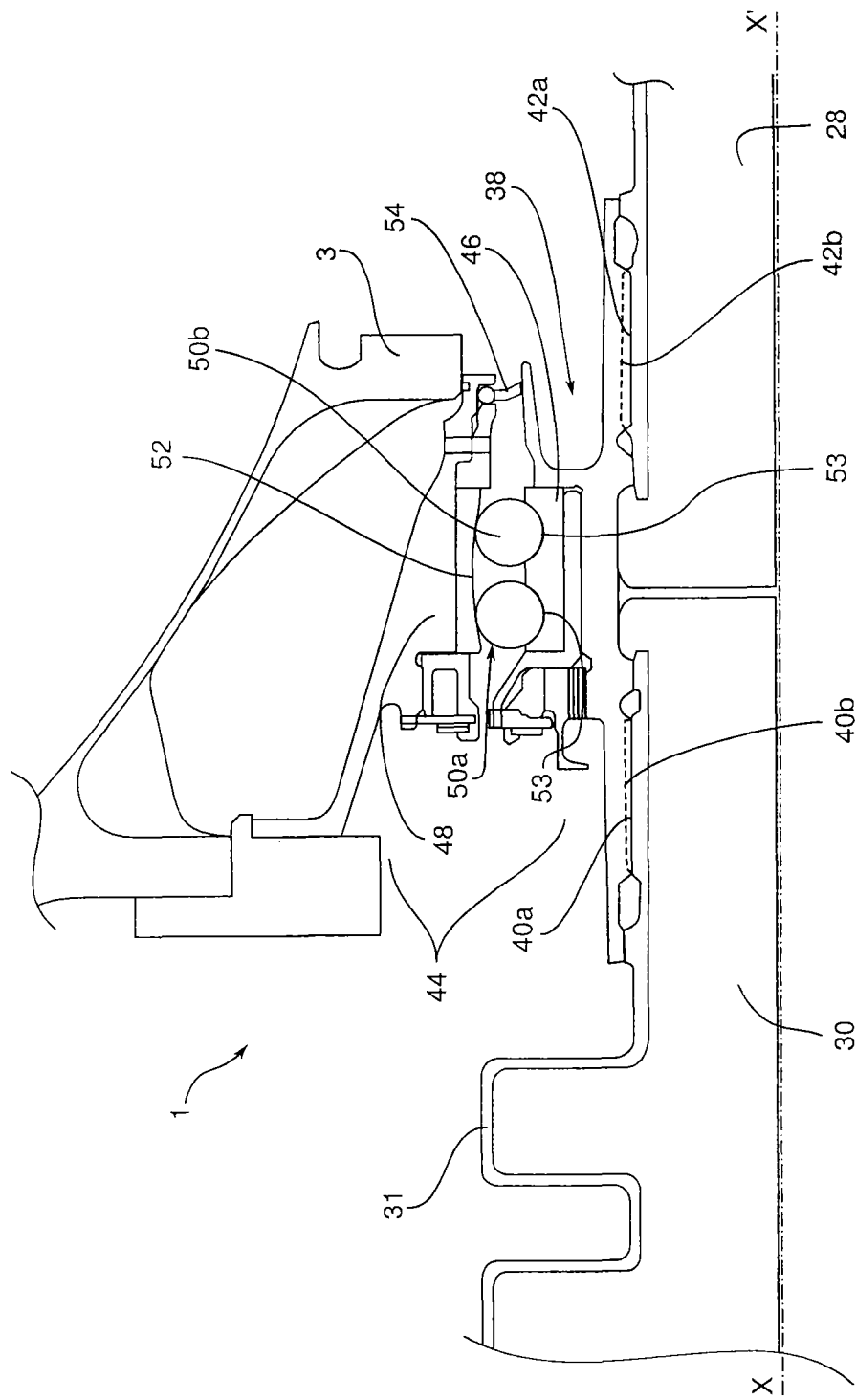

2012/0237336 A1    9/2012   McCune et al.
2012/0263578 A1   10/2012   Davis et al.
2013/0056982 A1    3/2013   Gozdawa

FOREIGN PATENT DOCUMENTS

GB     2476261    6/2011
JP     3-32135 U   3/1991

OTHER PUBLICATIONS

French Preliminary Search Report issued Sep. 18, 2013 in French Application 12 61859, filed on Dec. 11, 2012 ( with English Translation of Categories of Cited Documents).

* cited by examiner

GUIDANCE OF TURBINE ENGINE SHAFTS

FIELD OF THE INVENTION

The invention relates to the field of turbine engines, in particular for aircraft, and relates to an arrangement of drive shafts in a turbine engine.

PRIOR ART

In a known manner a turbine engine comprises at least one movable part, known as a rotor, which is mounted so as to rotate relative to a fixed part, known as a stator. Such a rotor generally comprises at least one turbine of which the turbine shaft is press-fitted in a second shaft which is connected to a power gear box known as a "PGB" and is known as a PGB shaft. Thus the turbine shaft drives the PGB shaft so that it transmits this driving force, for example to contrarotating propellers.

Ball bearings or roller bearings may be disposed between the rotor and the stator, in particular in the region of the turbine shaft and the PGB shaft, in order to guide these latter in rotation relative to the stator. One of these bearings may be a so-called "flexible" bearing which makes it possible to compensate at least partially for the misalignment between the bearings and to enable bending of the turbine shaft.

For shafts of substantial length, for example in open engine architectures known as "open rotor pullers", it is known to use a PGB shaft of which a portion is in the form of an accordion, that is to say deformable, in such a way as to limit the deformation of the PGB shaft under the action of a deformation of the turbine shaft and thus to reduce the effects of the bending of the turbine shaft on the PGB shaft.

However, such flexibility increases the mechanical stresses applied to the rigid connection produced by press-fitting between the PGB shaft and the turbine shaft, which creates a first drawback.

Moreover, a substantial length of the turbine shaft can nevertheless, in certain cases result in sufficient flexion to cause contact of the turbine shaft with the elements surrounding the turbine engine, which creates a second drawback.

Finally, the manipulations of installation or removal of the PGB shaft and the turbine shaft of the turbine engine are complex in so far as specific tooling is necessary in order to keep the two shafts aligned during their press-fitting and to avoid a situation in which one or the other shaft strikes and damages other elements of the turbine engine during these manipulations. Such tooling increases the time and the cost of maintenance of the turbine engine and therefore creates a third drawback.

DESCRIPTION OF THE INVENTION

The invention seeks to improve the structure of existing turbine engines and in particular to enable both a flexibility of the PGB shaft and the turbine shaft, in particular a bending of the turbine shaft, in particular for a turbine shaft of great length, whilst avoiding the contact of one or the other of these shafts, during the deformation thereof, with other elements of the turbine engine. The invention also seeks to reduce the maintenance costs associated with the installation and the removal of the shafts whilst making these operations easier for the operators.

To this end, the invention relates to a turbine engine, especially for aircraft, comprising a power gear box shaft, a turbine shaft, and a connecting part of annular shape by which one end of the power gear box shaft and one end of the turbine shaft are connected in a rotationally fixed manner, the turbine engine also including a structural housing and a guide bearing for guiding the connection part relative to the housing, the guide bearing being mounted between the connecting part and the housing and comprising an external ring mounted on the housing, an internal ring mounted on the connecting part and at least one rolling element configured in order to enable the external ring to roll around the internal ring, characterised in that the guide bearing is configured in order to form a ball joint link enabling a relative angular displacement of its external ring with respect to its internal ring.

Such a connecting part makes it possible to avoid the press-fitting of the turbine shaft and the power gear box shaft, which enables a decoupling of the two shafts and gives a greater flexibility to the connection between the two shafts. The effects, on one of the shafts, of the mechanical stresses exerted on the other shaft are therefore significantly reduced. Moreover, the two shafts can be installed or removed independently of one another, which avoids the use of specific tooling, which is complex and costly, in order to align the two shafts and therefore to make it possible to reduce the time and costs for maintenance.

The connecting part advantageously comprises a substantially cylindrical internal surface.

One of the ends of the power gear box shaft is preferably connected to the connecting part by a first splined connection and one of the ends of the turbine shaft is connected to the connecting part by a second splined connection. Such splined connections are both flexible and solid and enable installation and removal which are easy to perform.

In such a case, the connecting part comprises a first plurality of splines, on which is mounted a plurality of complementary splines of the end of the power gear box shaft, and a second plurality of splines on which is mounted a plurality of complementary splines of the end of the turbine shaft.

The connecting part preferably comprises the two pluralities of splines on its internal surface, the end of the power gear box shaft and the end of the turbine shaft being installed in the connecting part. The connecting part thus surrounds, at least in part, the end of the power gear box shaft and the end of the turbine shaft.

According to the invention, the turbine engine comprises a structural housing and a guide bearing for guiding the connecting part relative to the housing, the guide bearing being installed between the connecting part and the housing. The housing may be fixed whilst the connecting part may be movable or vice versa.

The guide bearing comprises an external ring mounted on the housing, an internal ring mounted on the connecting part and at least a rolling element configured to enable the external ring to roll about the internal ring.

The guide bearing is configured to form a ball joint link enabling a relative angular displacement of the connecting part with respect to the housing. In other words, such a ball joint link makes it possible to offset the external ring of the bearing relative to the internal ring of the bearing.

Thus, when the power gear box shaft and/or the turbine shaft are subjected to mechanical stresses which result, for example, in bending of the shaft, the angular displacement enabled by the ball joint link makes it possible on the one hand to avoid excessive stresses on the connection between the power gear box shaft and the turbine shaft, these latter no longer being mounted on one another as in the prior art, and on the other hand to transfer the stress of at least partial bending of the connection between the connecting part and the shafts to the guide bearing.

The rolling elements preferably comprise an axial portion of at least partially rounded shape in order to enable the ball joint link between the internal ring and the external ring, i.e. to enable an inclination of the internal ring with respect to the external ring. The term "axial" is understood to mean following the longitudinal axis of the turbine.

The rolling elements are preferably in the form of balls, for example metal.

According to one characteristic of the invention, the balls are disposed in an annular manner around the connecting part, forming for example one or several annular rows.

The guide bearing advantageously comprises two pluralities of balls disposed in two annular rows about the connecting part. Such an arrangement makes it possible to articulate the bearing axially about a ball joint link whilst enabling a relative solidity and stability of the housing and of the assembly formed by the power gear box shaft, the turbine shaft and the connecting part.

According to one characteristic of the invention, the external ring comprises a curved zone for supporting rolling elements in such a way as to enable the ball joint link between the external ring and the internal ring in the region of said zone. Such a zone increases the degree of flexibility of the ball joint link which thus is essentially articulated between the external ring and the rolling elements.

Alternatively, the internal ring comprises a zone for supporting rolling elements of which the shape is curved in such a way as to enable an inclination of the internal ring relative to the external ring, i.e. in such a way as to enable the ball joint link between the internal ring and the external ring. Such a zone increases the degree of flexibility of the ball joint link which thus is essentially articulated between the internal ring and the rolling elements.

According to one aspect of the invention, the guide bearing also comprises a seal, for example a brush seal, extending between the external ring and the internal ring, configured in order to ensure the sealing between the external ring and the internal ring regardless of the relative angle between the axes of the two rings.

Figure 2:
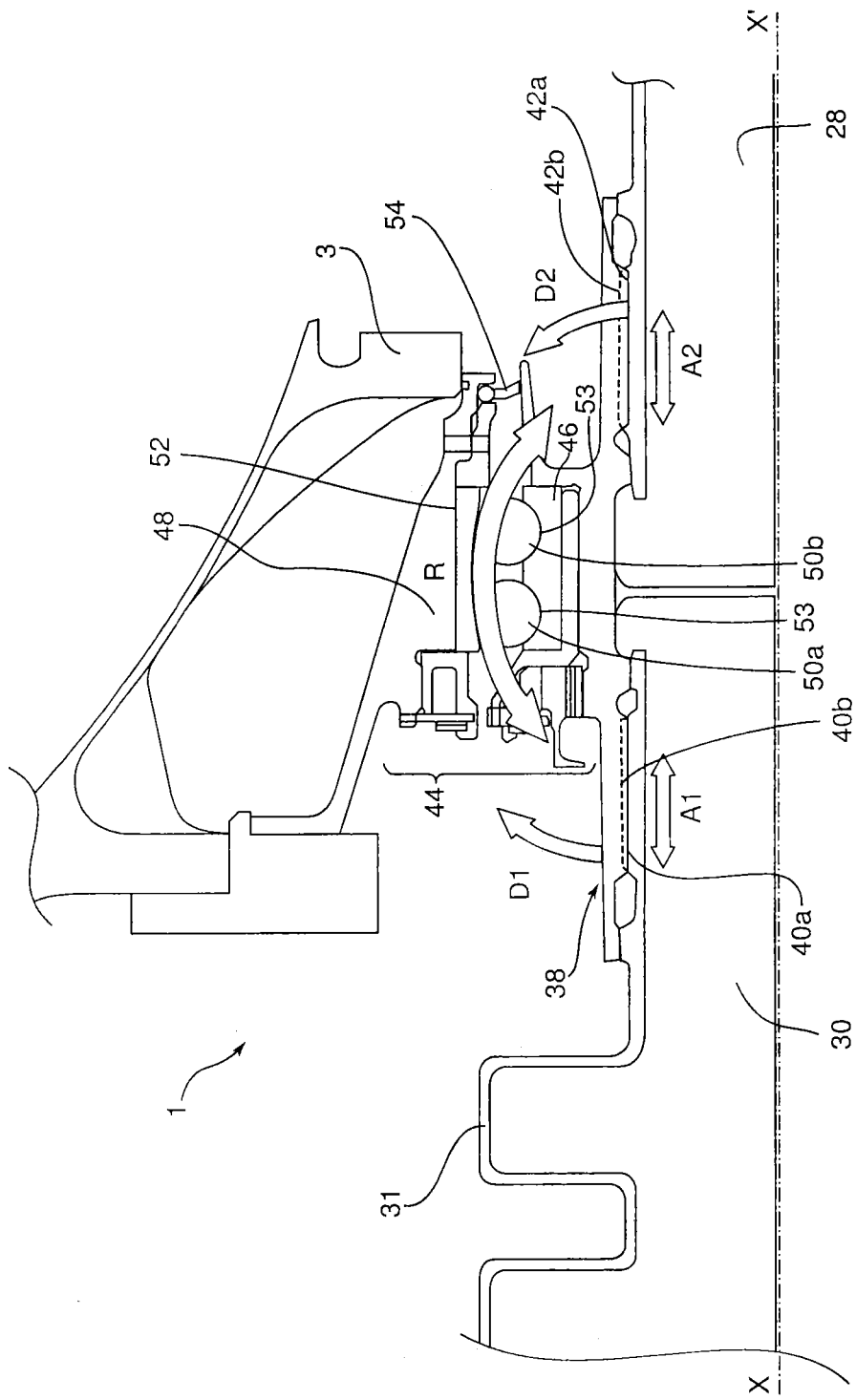

Other characteristics and advantages of the invention will become apparent from the following description which is given with reference to the appended drawings, which are non-limitative examples and in which identical reference numerals are given to similar objects:

FIG. 1 shows a partial axial sectional view of a turbine engine according to the invention comprising a connecting part in which are mounted a power gear box shaft and a turbine shaft, a guide bearing and a structural housing, FIG. 2 illustrates the degrees of freedom of certain elements of the turbine engine of FIG. 1.

DETAILED DESCRIPTION

The invention may be used in any type of turbine engine, in particular an aircraft engine, such as a turbojet engine, a turboshaft engine etc. Such a turbine engine 1 comprises a rotor which is movable with respect to a fixed stator. The rotor comprises at least one compressor and at least one turbine (not shown). The stator comprises a combustion chamber (not shown), disposed between the compressor and the turbine, and a structural housing 3 illustrated in FIGS. 1 and 2.

When the turbine engine is in operation, air taken at the exterior is routed by an air inlet conduit (not shown) to the compressor which delivers compressed air to the combustion chamber in which it is mixed with fuel. The gases resulting from the combustion of the mixture then make it possible to drive the turbine which in turn drives a turbine shaft 28.

The turbine shaft 28 is joined to a shaft 30 of a power gear box (PGB, not shown) of the turbine engine 1, referred to hereafter as the PGB shaft 30, which for example makes it possible to drive the propellers of the aircraft.

In a known manner the PGB shaft 30 comprises an accordion-shaped portion 31 configured to provide flexibility to the PGB shaft 30 in order to re-align it with the turbine shaft 28 after one of the two shafts has undergone a mechanical deformation. Thus the accordion-shaped portion 31 limits the transmission tensional force or bending force between the PGB shaft 30 and the turbine shaft 28.

The power gear box may for example be in the form of a differential reduction gear (not shown) which makes it possible to transmit a torque, for example to propellers, as a function of the torque received by the PGB shaft 30.

As illustrated by FIG. 1, the turboprop engine 1 comprises a connecting part 38 of substantially cylindrical shape in which the PGB shaft 30 and the turbine shaft 28 are mounted end to end. Thus the connecting part 38 fulfils a function as interface between the PGB shaft 30 and the turbine shaft 28.

Thus the axes of the connecting part 38, the upstream PGB shaft 30 and the downstream turbine shaft 28 are mounted substantially coaxially along the longitudinal axis XX' of the turbine engine 1. The terms "upstream" and "downstream" should be understood to be relative to the overall direction of the air stream circulating in the turbine engine during operation.

The end of the PGB shaft 30 and the end of the turbine shaft 28 are mounted end to end in the connecting part 38, in each case by a splined connection. Thus, in order to join the connecting part 38, the PGB shaft 30 and the turbine shaft 28 in a rotationally fixed manner, the connecting part 38 comprises a first plurality of upstream splines 40a disposed on an upstream first cylindrical portion of its internal surface and a downstream second plurality of splines 42a, represented by dotted lines, disposed on a second cylindrical portion of its internal surface.

Thus, the end of the PGB shaft 30 comprises a plurality of downstream splines 40b complementary to the first plurality of upstream splines 40a of the connecting part 38 and the end of the turbine shaft 28 comprises a plurality of upstream splines 42b, represented by dotted lines, complementary to the second plurality of downstream splines 42a of the connecting part 38.

The connecting part 38, the PGB shaft 30 and the turbine shaft 28 are joined to the turbine shaft in a rotationally fixed manner but the PGB shaft 30 and the turbine shaft 28 are not connected to one another directly, which advantageously enables the mounting or the removal of one of the shafts in the connecting part 38 independently of the other and therefore makes it possible to avoid the use of specific equipment for retention of the shafts during their mounting or removal.

Moreover, such an arrangement ensures that the mechanical stresses, for example by bending, undergone by one of the shafts does not have direct repercussions on the other shaft. Furthermore, when the splined connections and/or the connecting part are flexible such an arrangement allows a misalignment of the shafts with respect to one another in order to mitigate the transmission of stresses to which they are subjected. Moreover, the connecting part 38 makes it possible to preserve the rigidity of the assembly which it forms with the PGB shaft 30 and the turbine shaft 28, which makes it possible to avoid contact of the shafts with other elements of the turboprop engine.

In order to retain the connecting part 38 of the turboprop engine 1, a guide bearing 44 is disposed between the connecting part 38 and the structural housing 3. This bearing 44 comprises an internal ring 46 mounted integrally on the connecting part 38 and an external ring 48 mounted integrally on the structural housing 3, the internal ring 46 being disposed coaxially with respect to the interior of the external ring 48.

The guide bearing 44 also comprises two ball assemblies 50a and 50b disposed annularly between the internal ring 46 and the external ring 48 so that these latter can turn with respect to one another, thus forming a ball bearing.

The two ball assemblies 50a and 50b are offset axially and accommodated in annular grooves 53 in which they are retained axially.

As illustrated by FIGS. 1 and 2, the guide bearing 44 is configured to enable a relative offset of the internal ring 46 and the external ring 48, that is to say an angular articulation of the two rings with respect to the axis XX' of the turboprop engine 1.

Of course any rolling element comprising an axial portion of at least partially rounded shape in order to enable an inclination of the internal ring 46 with respect to the external ring 48 may be used in place of the balls.

As illustrated by FIG. 2, in order to obtain such an angular displacement the guide bearing 44 is configured in order to form a ball joint link R between the internal ring 46 and the external ring 48, i.e. in extenso, between the connecting part 38 and the structural housing 3.

More precisely, the external ring 48 comprises a curved portion 52 enabling articulation of the external ring relative to the rows of balls 50a and 50b. The curved zone 52 has a V-shaped section of which the point is oriented radially towards the exterior in such a way that the branches of the V are respectively in contact with the balls 50a, 50b.

Thus an offset D1, D2 of one of the two shafts 28, 30 with respect to the axis of the turbine XX', caused for example by bending of the turbine shaft 28, results in an angular displacement of the connecting part 38 which is articulated about the ball joint link R of the guide bearing 44.

Such an articulation enables a deformation of one of the two shafts 28, 30 without significant repercussion on the other shaft whilst making it possible to preserve sufficient rigidity of the assembly in order to prevent the deformation of one of the shafts 28, 30 from resulting in contact with other elements of the turboprop engine 1 which could damage them.

Moreover, the connecting part 38 and the splined connections 40a, 40b and 42a, 42b make it possible to axially separate the PGB shaft 30 from the turbine shaft 28 which are no longer press-fitted in one another as in the solution according to the prior art.

The splined connection 40a, 40b also enables an axial displacement A1 of the PGB shaft 30 with respect to the connecting part 38. Thus a deformation of the PGB shaft 30 may be at least partially absorbed by such an axial displacement A1, which reduces the effects of such a deformation, in particular, on the connecting part 38 and on the turbine shaft 28.

Likewise the splined connection 42a, 42b enables an axial displacement A2 of the turbine shaft 28 with respect to the connecting part 38. Thus a deformation of the turbine shaft 28 may be at least partially absorbed by such an axial displacement A2, which reduces the effects of such a deformation, in particular, on the connecting part 38 and on the PGB shaft 30. Thus the connecting part 38 fulfils a function of axial absorption between the shafts.

Preferably, with reference to FIGS. 1 and 2, the guide bearing 44 also comprises a brush seal 54, extending between the external ring 48 and the internal ring 46 and configured to ensure the sealing between the external ring 48 and the internal ring 46 regardless of the relative angle between the axes of the rings.

The invention claimed is:

1. A turbine engine comprising:
   a power gear box shaft;
   a turbine shaft driven by a turbine of the turbine engine;
   a connecting part of annular shape by which only one end of the power gear box shaft and one end of the turbine shaft are connected in a rotationally fixed manner;
   a structural housing; and
   a guide bearing for guiding the connecting part relative to the housing, the guide bearing being mounted between the connecting part and the housing, and comprising
   an external ring mounted on the housing,
   an internal ring mounted on the connecting part, and
   rolling elements configured to enable the external ring to roll around the internal ring,
   wherein the guide bearing is configured to form a ball joint link enabling a relative angular displacement of the external ring with respect to the internal ring,
   wherein the power gear box shaft and the turbine shaft are not directly connected to each other,
   wherein the connecting part comprises a first plurality of upstream splines disposed at an upstream extremity and a second plurality of downstream splines disposed at a downstream extremity, the end of the power gear box shaft comprising a plurality of downstream splines complementary to the first plurality of upstream splines of the connecting part and the end of the turbine shaft comprising a plurality of upstream splines complementary to the second plurality of downstream splines of the connecting part,
   wherein the upstream splines of the connecting part and the downstream splines of the power gear box shaft are located upstream of the rolling elements of the guide bearing, and
   wherein the downstream splines of the connecting part and the upstream splines of the turbine shaft are located downstream of the rolling elements of the guide bearing.

2. The turbine engine according to claim 1, wherein the rolling elements comprise an axial portion of at least partially rounded shape in order to enable an inclination of the internal ring with respect to the external ring.

3. The turbine engine according to claim 1, wherein the guide bearing comprises first and second pluralities of balls disposed in first and second annular rows.

4. The turbine engine according to claim 1, wherein at least one of the external ring and the internal ring includes a curved support zone for the rolling elements, such that the curved support zone extends axially from a first axial free end to a second axial free end of the external ring or the internal ring, so as to enable an inclination of the internal ring with respect to the external ring.

* * * * *